June 6, 1933.                    J. H. HAAS                    1,912,839
                              FRONT WHEEL DRIVE
                           Filed Aug. 12, 1930

INVENTOR
JAMES HOWARD HAAS
by
ATTORNEY

Patented June 6, 1933

1,912,839

UNITED STATES PATENT OFFICE

JAMES HOWARD HAAS, OF HUNTINGTON PARK, CALIFORNIA, ASSIGNOR OF ONE-TWENTIETH TO JAMES B. FARRINGTON, OF LOS ANGELES, CALIFORNIA

FRONT WHEEL DRIVE

Application filed August 12, 1930. Serial No. 474,852.

This invention relates to a front wheel drive particularly applicable to motor vehicles, and the prime object is to provide a novel front wheel drive, the universal joint of which is placed on the center line of the wheel, thus providing a drive which will not hinder the turning of the front wheels, and which results in a minimum of wear on the universal joint.

Another object is to provide a front wheel drive, the axle of which is of the full floating type and runs in a housing which supports the load.

Still another object is to provide a front wheel drive which is simple to assemble or disassemble.

A further object is to provide a front wheel drive, the universal joint of which is enclosed in a box or ball joint where it is not open to accumulation of dirt, and where said joint can be effectively lubricated.

Other objects, advantages, and features or invention may appear from the accompanying drawing, the subjoined detailed description, and the appended claims.

In the drawing

Figure 1:
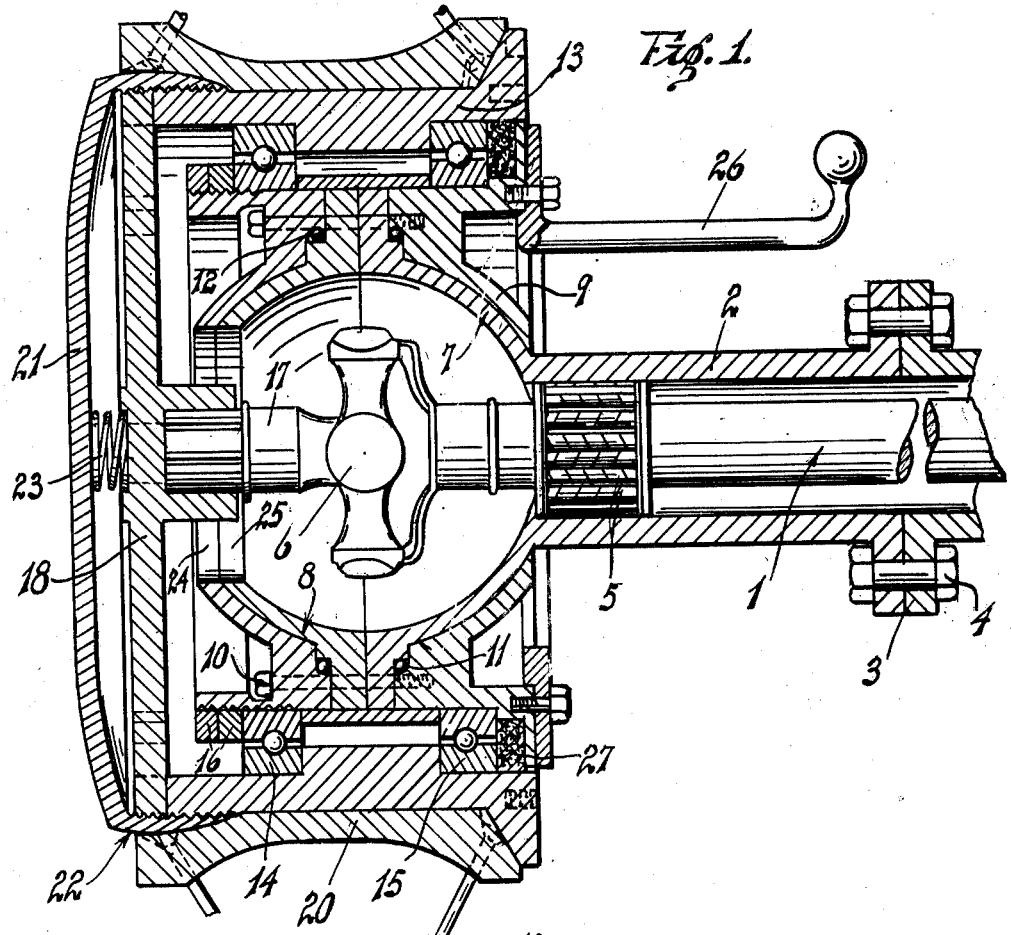
Figure 1 is a transverse, sectional view of my front wheel drive.
Figure 2:
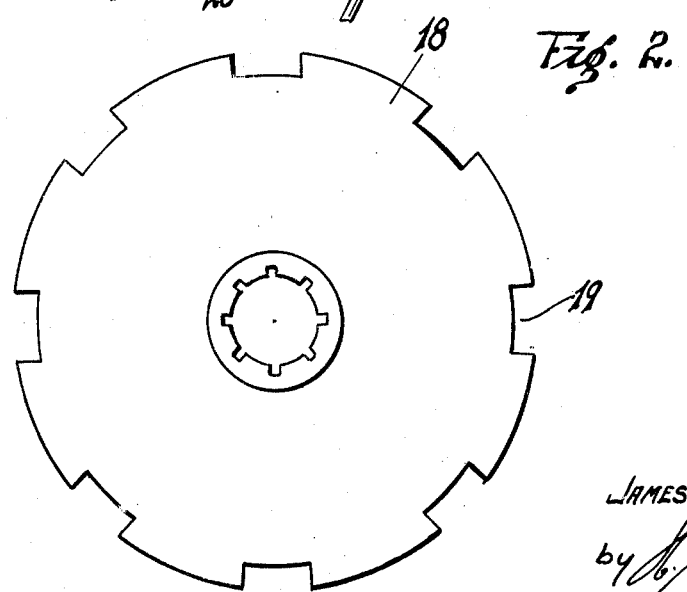
Figure 2 is a side view of the driving plate.

Referring more particularly to the drawing, the numeral 1 indicates the axle which extends to the usual differential gearing (not shown), and which is driven by the motor in the usual manner. A housing 2 encloses the axle 1 and this housing is split as at 3, adjacent the outer end thereof. At the part, flanges are provided and bolts 4 extend through the flanges, thus securing the inner and outer sections of the housing together, and when necessary, the entire outer end of the housing, and the axle can be readily removed and an entirely new drive unit can be installed.

A bearing 5 is mounted in the housing 2 adjacent the outer end thereof, and this bearing supports the outer end of the axle 1 thus the axle is supported at both the inner and outer ends and will run true and with less wear upon the universal joint 6 which is provided adjacent the outer end of the axle. This universal joint is positioned on the center line of the wheel and this assembly enables the front wheels to turn more readily and without and hindrance, and also there is less wear upon the universal joint.

At the outer end of the housing 2 I provide a hemispherical joint member 7. The complete spherical joint is formed by a coacting hemispherical joint member 8 and this spherical joint thus formed completely houses the universal joint 6. A spherical seat 9 is provided for the parts 7—8 and this seat is also formed in two parts held together by a plurality of bolts 10 which extend through the seat member but not through the hemispherical joint members 7 and 8. Spindle pins extend upwardly and downwardly from the joint members 7—8 and the bolts 10 pass to the side of these spindle pins.

Thrust bearings 11—12 are positioned between the halves of the seat 9 and the members 7—8. A driving hub 13 is mounted around the stationary seat 9 and a plurality of combination annular and thrust bearing 14—15 are positioned between the seat 9 and the driving hub 13. Lock nuts 16—16 screw on to the outer end of the seat 9 against the bearing 14, and the bearing shoulders against a seat on the driving hub 13, thus holding the driving hub in proper relation to the stationary seat 9.

A stub shaft 17 projects outwardly from the universal joint 6 and this stub shaft is squared or splined at the outer end and a driving plate 18 fits upon the squared or splined end of the shaft 17. The outer periphery of the plate 18 is notched as at 19, and lugs on the driving hub 13 project into the notches thus forming a driving connection between the plate 18 and the driving hub.

The wheel hub 20 fits upon the driving hub 13, and the wheel hub is held in position by a hub cap 21 which screws on to the driving hub 13, and is formed with a tapered locking surface 22 which fits against a tapered surface on the wheel hub, thus holding the wheel securely in position on the driving hub. A spring 23 is positioned between the hub 21 and the driving plate 18 to hold the plate pressed inwardly in proper driving position. The seat 9 and the member 8 are each provided with an opening 24—25 respectively in the outer portions thereof, and these openings are co-incidental and are of sufficient diameter to permit the universal joint 6 to pass therethrough. If the axle 1 should break, it is only necessary to remove the hub cap 23 and the driving plate 18 after which the shaft can be pulled out and a new one inserted.

A drag link arm 26 is secured to the stationary seat 9 for the purpose of guiding the vehicle. A felt washer 27, formed as a ring, is positioned between the seat 9 and the annular bearing 15 thereby preventing the leakage of oil at the inside of the wheel. Oil cannot pass from the outside because of the hub cap 23 which is tightly screwed in position.

Having described my invention, I claim:

1. A front wheel drive comprising an axle, a housing in which the axle is positioned, a two piece spherical joint formed on the outer end of said housing, a two piece spherical seat in which the joint rests means securing the parts of the spherical seat together, a universal joint in the ball joint, said universal joint being on the center line of the wheel, a driving hub, bearings between the driving hub and said seat, a driving plate, said driving plate being fitted on to the end of the axle, and means connecting said driving plate and driving hub whereby said driving hub is rotated.

2. A front wheel drive comprising an axle, a housing in which the axle is positioned, a ball joint formed on the outer end of said housing, said ball joint being formed in two parts, a two piece seat in which the ball joint rests, bolts extending through the halves of the seat, a universal joint in the ball joint, said universal joint being on the center line of the wheel, a driving hub, a driving plate, said driving plate being removably mounted on the outer end of the axle, and means securing said driving plate to the driving hub.

3. A front wheel drive comprising an axle, a housing in which the axle is positioned, a ball joint formed on the outer end of said housing, said ball joint being formed in two parts, a two piece seat in which the ball joint rests, bolts extending through the halves of the seat, a universal joint in the ball joint, said universal joint being on the center line of the wheel, a driving hub, a driving plate, said driving plate being removably mounted on the outer end of the axle, and means securing said driving plate to the driving hub, a bearing in the housing adjacent the outer end thereof, said bearing supporting the axle, a wheel hub fitted on the driving hub, and a cap screwed on to the driving hub and engaging the wheel hub whereby said wheel hub is held in position.

4. A front wheel drive comprising an axle, a housing in which the axle is positioned, a ball joint formed on the outer end of said housing, said ball joint being formed in two parts, a two piece seat in which the ball joint rests, bolts extending through the halves of the seat, a universal joint in the ball joint, said universal joint being on the center line of the wheel, a driving hub, a driving plate, said driving plate being removably mounted on the outer end of the axle, and means securing said driving plate to the driving hub, annular bearings between the driving hub and the seat, a wheel hub fitting on the driving hub and a cap screwed on to the driving hub and engaging the wheel hub whereby said wheel hub is held in position.

In testimony whereof, I affix my signature.

JAMES HOWARD HAAS.